United States Patent [19]

Lodding et al.

[11] 4,346,515
[45] Aug. 31, 1982

[54] TELESCOPIC MATING APPARATUS

[75] Inventors: William F. Lodding, Downers Grove; John T. Murray, Oakbrook, both of Ill.

[73] Assignee: Miles Laboratories, Inc., Elkhart, Ind.

[21] Appl. No.: 139,285

[22] Filed: Apr. 11, 1980

[51] Int. Cl.³ .............................................. B23P 19/04
[52] U.S. Cl. ........................................ 29/773; 29/786; 29/787; 29/455 R; 53/315
[58] Field of Search ...................... 29/455 R, 429, 773, 29/786, 793, 794, 771; 53/313, 315, 317, 534

[56] References Cited

U.S. PATENT DOCUMENTS 3,082,514 3/1963 Sterling ................................. 29/773
3,332,200 7/1967 Englander ............................. 53/534
3,938,675 2/1976 Rees ...................................... 414/905
3,983,616 10/1976 Duke ..................................... 53/315
3,994,059 11/1976 Watson ................................. 29/429

FOREIGN PATENT DOCUMENTS 1167993 12/1958 France ................................. 53/315

Primary Examiner—Daniel C. Crane
Attorney, Agent, or Firm—Louis E. Davidson

[57] ABSTRACT

Apparatus and process are described for telescopically mating top and bottom molded petri dish members wherein the top and bottom members positioned in spaced, substantially coaxial face-to-face relation are moved along a predetermined path, and during travel along such path are moved toward each other into telescopic assembled relation.

1 Claim, 5 Drawing Figures

TELESCOPIC MATING APPARATUS

BACKGROUND AND PRIOR ART

Molded top and bottom dish members for petri dishes are usually produced in stack molds wherein the dish members are molded in back-to-back relation with the dish openings of the top and bottom members positioned in oppositely facing directions. The top and bottom members are then usually separately conveyed in flat horizontal positions to an assembly location wherein the top members are manually or automatically placed over the bottom members. Assembly apparatus for this procedure is disclosed in U.S. Pat. No. 3,938,675. The use of this apparatus is unsatisfactory for two reasons. First, it is usually located a considerable distance from the molding apparatus. This enables the top and bottom dish members to become contaminated prior to assembly of the finished petri dish necessitating a subsequent sterilization step. Second, it is a rather complex apparatus requiring many moving parts.

Apparatus is known for bringing various container members into telescoping relationship. U.S. Pat. No. 3,844,896 discloses apparatus for removing top members from petri dishes and then replacing them. U.S. Pat. No. 3,983,616 discloses apparatus for assembling lids on glass containers. U.S. Pat. No. 3,994,059 discloses apparatus for assembling oil filter components.

There is no known prior art which discloses or suggests the assembly of top and bottom petri dish members while still at an elevated molding temperature by positioning such members in spaced, substantially coaxial face-to-face relation, moving such members along a predetermined path, and as such members are moved along said path, moving them toward each other into telescopic assembled relation.

SUMMARY OF THE INVENTION

In accordance with the present invention, apparatus for assemblying top and bottom petri dish members in telescopic relation is provided comprising means adapted to receive a top and a bottom petri dish member supplied thereto in face-to-face substantially coaxial spaced relation, guide means defining a predetermined path for simultaneous movement of said top and bottom members away from said receiving means, an abutment means engageable with at least one of said top and bottom members during movement thereof along said predetermined path, said abutment means being positioned to cause relative coaxial movement of said top and bottom members toward each other into telescopic assembled relation as said members traverse said predetermined path.

In accordance with another aspect of the present invention a process is provided for assembling top and bottom petri dish members in telescopic relation comprising the steps of positioning a top and a bottom petri dish member in substantially coaxial spaced face-to-face relation and then moving said members along a predetermined path extending transverse to the axis of said members while simultaneously imparting to said members relative coaxial movement toward each other into assembled telescopic relation.

DESCRIPTION OF THE INVENTION

Figure 1:
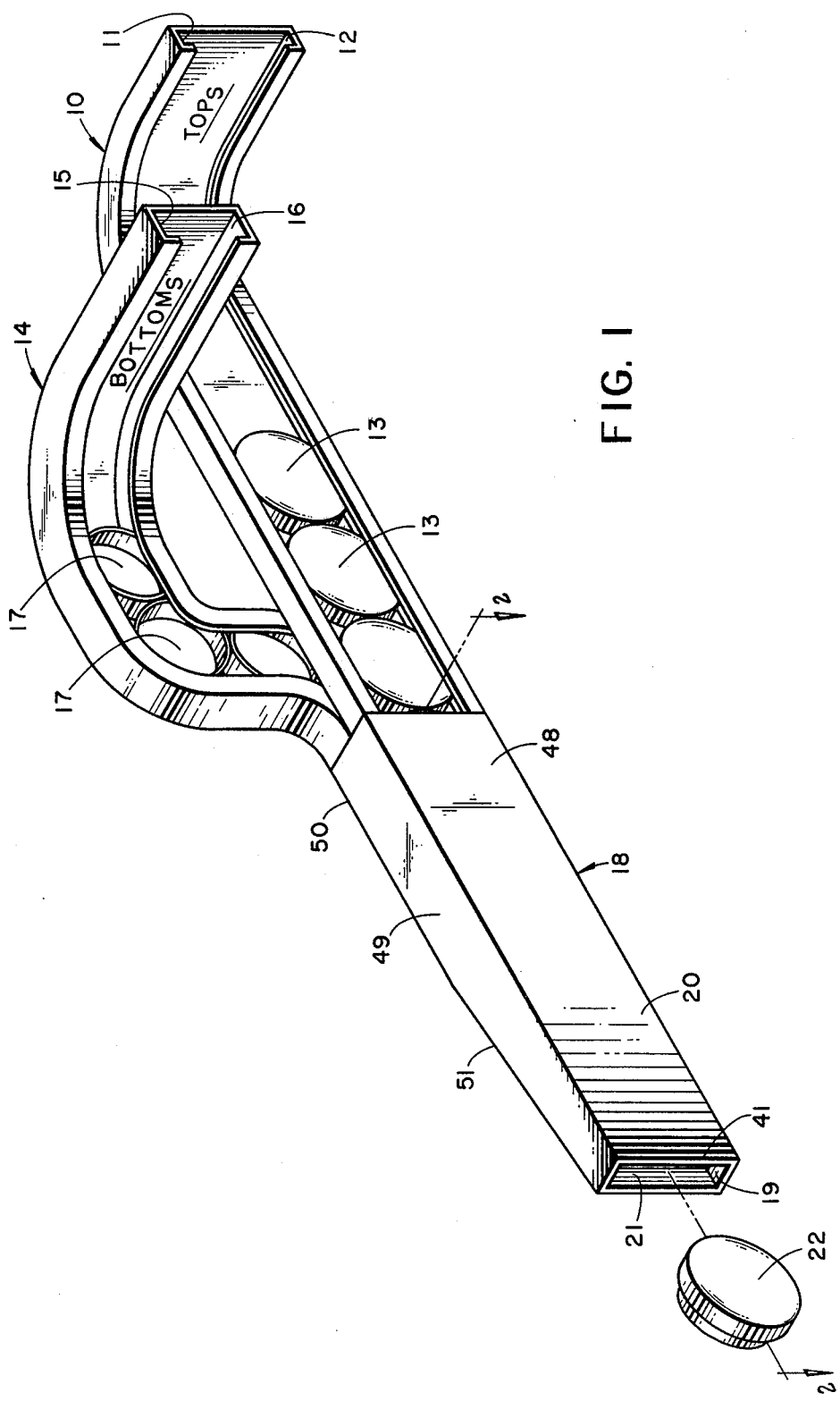
FIG. 1 is an isometric perspective view of one form of the apparatus of the present invention.
Figure 2:
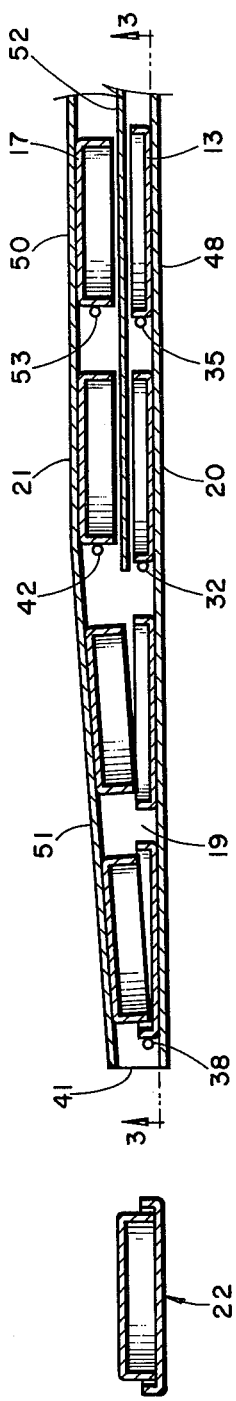
FIG. 2 is a horizontal cross-section view of a portion of the apparatus of FIG. 1 taken along Line 2—2 of FIGS. 1 and 3.

With reference to FIG. 1 of the accompanying drawings the apparatus of the present invention has a first conveying or supply trough means 10 formed of a rectangular C-shaped cross-section having an upper groove 11 and a lower groove 12 into which first top petri dish members 13 are positioned with the dish openings or faces of said members facing away from the viewer as shown. A second conveying or supply trough means 14 formed of a rectangular C-shaped cross-section having an upper groove 15 and a lower groove 16 is provided into which second bottom petri dish members 17 are positioned with the dish openings or faces thereof facing in the direction opposite the direction dish members 13 face, for example toward the viewer as shown. These are the positions of the top and bottom members as they are ejected from a stack mold; i.e., in back-to-back relation. As shown in FIG. 1, the second supply means 14 is directed so as to crossover the first supply means 10 so as to position the bottom members 17 therein in face-to-face relation with the top members 13 in supply means 10. This relationship is shown at the right hand portion of FIG. 2. The first and second supply means 10 and 14 are inclined downward and communicate with the housing 48 of an assembly unit 18. Housing 48 is tubular in shape and has parallel top and bottom walls 49 and 19 and two vertical sidewalls 20 and 21 with an exit opening or end 41. As shown in FIGS. 1 and 2, the sidewall 20 is planar, whereas the sidewall 21 has a portion 50 which is parallel with wall 20 and a portion 51 which angles toward wall 20. As shown in FIG. 2, a vertical separator wall 52 is disposed in spaced parallel relation between wall portion 50 and sidewall 20, and supply means 10 and 14 are positioned to deliver top members 13 and bottom members 17 respectively to the interior of housing 48 in vertical face-to-face relation on opposite sides of the separator wall 52. Supply means 10 and 14, as well as housing 48, are inclined downwardly, as shown in FIG. 1, to facilitate rolling movement of the top and bottom members 13 and 17.

As shown in FIG. 2, the top and bottom members 13 and 17 roll toward the left along a predetermined path within the housing 48 which functions as a guide means. During such movement, the bottom members 17 are simultaneously moved toward the top members 13 by their engagement with the angled sidewall or abutment portion 51. This causes the smaller diameter bottom members 17 to be moved telescopically into the top members 13 so that upon discharge from housing 48 through exit 41 the members 13 and 17 form a completely assembled petri dish unit 22. The assembled petri dishes can then be collected in any suitable and desired manner known to those skilled in the art. The apparatus of this invention can be employed to assemble petri dishes while the molded top and bottom members are still at an elevated molding temperature. Under these assembly conditions, the elevated temperature effectively maintains the petri dish components in a sterilized condition. Thus the assembled petri dishes can be packaged for use without the necessity for subsequent separate sterilization if so desired.

Figure 3:
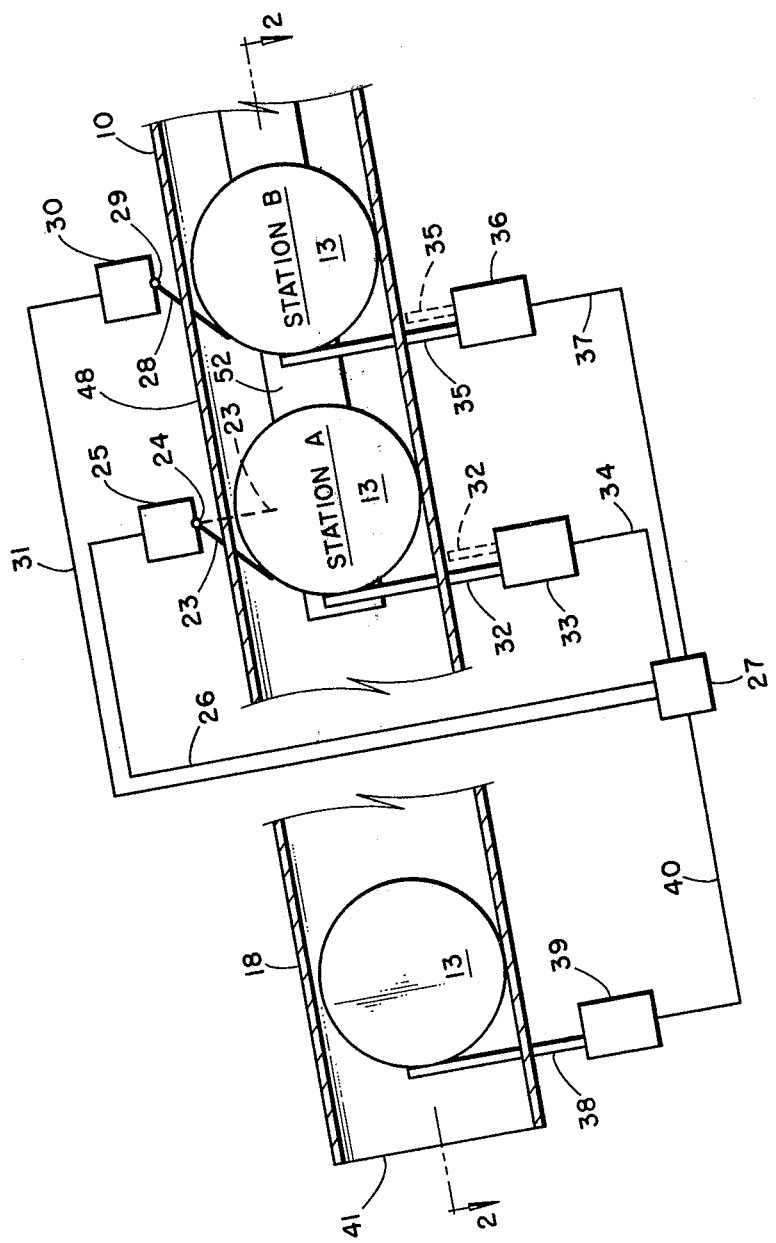
FIG. 3 is a vertical cross-section view of a portion of the apparatus taken generally along the Line 3—3 of FIG. 2.

In order for the top and bottom dish members 13 and 17 to be properly assembled in the manner described, they must travel within the assembly unit 18 in a specific manner. This is provided by a combination of sensor and control means forming part of assembly unit 18 and shown in cross-section and partial schematic fashion in FIGS. 2 and 3. FIG. 3 illustrates apparatus for control of movement through Stations A and B within assembly unit 18 of top members 13 supplied to said unit by supply means 10. Similar apparatus (some of which is not shown) is provided for control of movement through Stations A and B within unit 18 of bottom members 17 supplied to said unit by supply means 14.

A first sensor means for top members 13 at Station A comprises a sensor switch 25 having a finger 23 rotatably mounted at 24. Switch 25 is connected through line 26 to a controller 27. A second sensor means for top members 13 at Station B, located up-stream from Station A, comprises a sensor switch 30 having a finger 28 rotatably mounted at 29. The switch 30 is connected with controller 27 through line 31.

First control means for top members 13 at Station A comprises a control rod 32 having an electroresponsive actuator 33 for movement thereof between the solid line interrupting position and the broken line noninterrupting retracted position shown. The actuator 33 is connected through line 34 to controller 27. The control rod 42 of a corresponding control means for control of bottom members 17 at Station A is shown in FIG. 2. A second control means for top members 13 at Station B comprises a control rod 35 having an electroresponsive actuator 36 for movement thereof between the solid line interrupting position and the broken line noninterrupting retracted position shown. The actuator 36 is connected through line 37 to controller 27. The control rod 53 of a corresponding control means for control of bottom members 17 at Station B is shown in FIG. 2.

A third control means for control of discharge of assembled petri dishes from the lower end 41 of housing 48 comprises control rod 38 having an electroresponsive actuator 39 for movement thereof between the solid line interrupting position shown and a retracted noninterrupting position (not shown). Actuator 39 is connected through line 40 to controller 27.

At the start of operation, control rods 32, 42 and 38 are in their extended interrupting positions and control rods 35 and 53 are in their retracted noninterrupting positions. Top members 13 supplied to assembly unit 18 by supply means 10 roll edgewise therein until the leading member is stopped by abutment with control rod 32 at Station A, at which position said member is sensed by finger 23 which is moved thereby to its solid line position shown. Similarly, bottom members 17 supplied to the assembly unit 18 by supply means 14 roll edgewise therein until the leading member is stopped by abutment with control rod 42 at Station A, at which position said member is sensed by the sensor means finger (not shown) correspond to finger 23. If sensing finger means 23 for top members 13 and the corresponding sensing finger (not shown) for bottom members 17 indicate the presence of both top and bottom members at Station A, the controller 27 causes actuator 36 and the corresponding actuator (not shown) to move control rods 35 and 53 to their extended interrupting positions. This prevents any top or bottom members from rolling past Station B.

Controller 27 then causes actuator 33 for top members 13 and the corresponding actuator (not shown) for bottom members 17 to retract control rods 32 and 42 to their noninterrupting positions thereby enabling the top member 13 and bottom member 17 at Station A to roll downwardly toward the lower end 41 of housing 48. Control rod 42 is located slightly upstream from control rod 32 which enables the bottom member 17 to initially slightly trail top member 13. As both members roll forward together, the bottom member 17, by its engagement with the angled sidewall portion 51, is moved axially toward top member 13 and eventually into telescopic relation within the top member as shown in FIG. 2. The assembled top and bottom members then roll into abutment with control rod 38, which is in its interrupting position shown in FIG. 3. Alternatively, control rods 32 and 42 could be located in a nontrailing relationship and the activation of control rod 42 could be slightly delayed in order to achieve the initial trailing relationship for bottom member 17 as compared to top member 13 at Station A.

Once the top and bottom members move out of Station A, the sensing finger 23 and the corresponding finger (not shown) for sensing a bottom member 17 at Station A sense the absence of top and bottom members at Station A. Controller 27 then causes actuator 33 and the corresponding actuator (not shown) for bottom members 17 at Station A to extend control rods 32 and 42 to their interrupting positions. Controller 27 also causes actuator 39, actuator 36 and the actuator (not shown) for bottom members 17 at Station B to retract control rods 38, 35 and 53 to their noninterrupting positions. This enables the assembled petri dish 22 to roll out the exit 41 of housing 48 and permits the top and bottom members at Station B to roll into engagement with the extended control rods 32 and 42 at Station A, whereupon the operating cycle is repeated.

The above discussions of control rods 32 and 35, for example, for controlling the movement of petri dish members through housing 48 is intended to be illustrative only. It is understood that other means, such as a rocker arm linkage with only one activating means (not shown) could also be employed for this same purpose.

Figure 4:
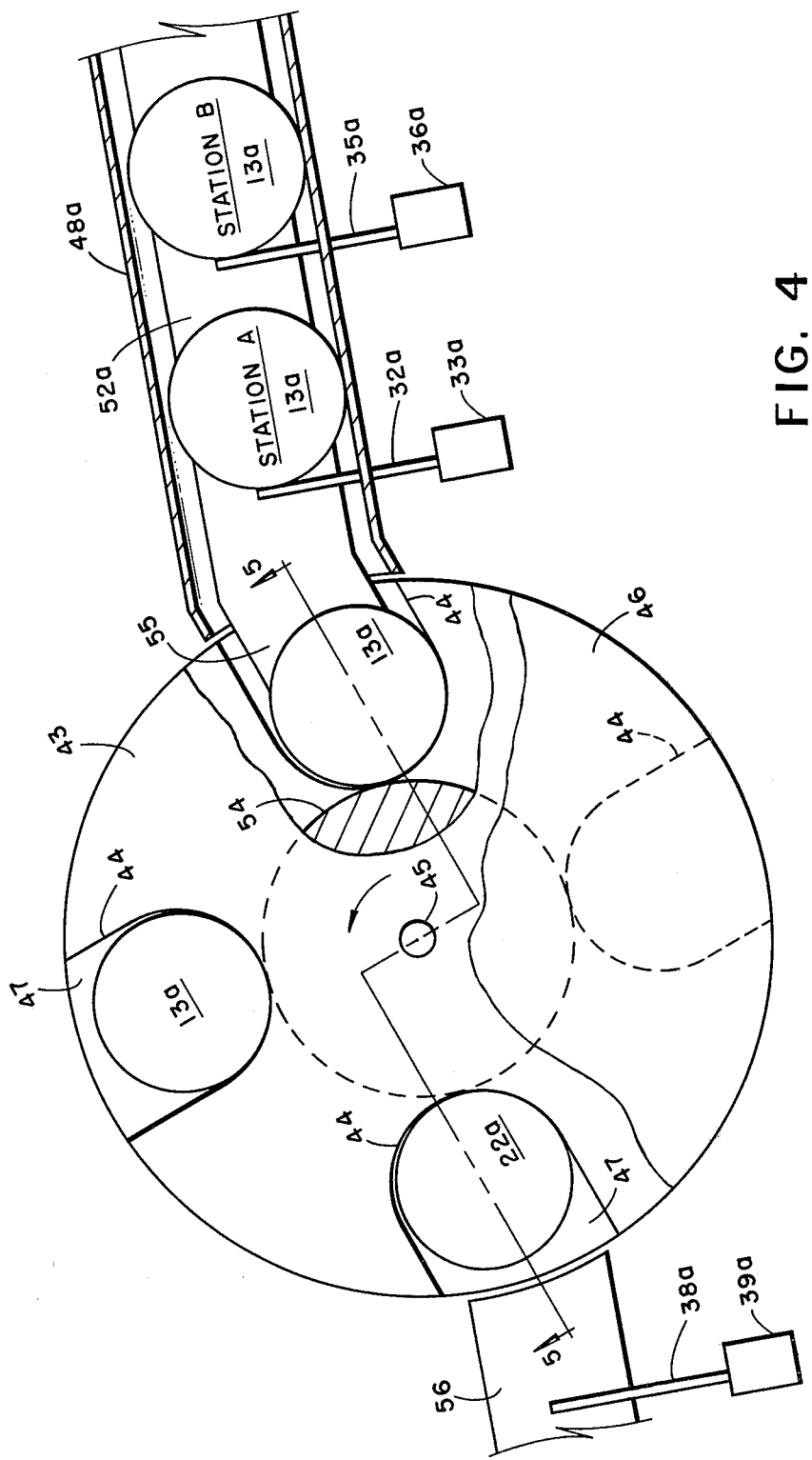
FIG. 4 is a vertical cross-section view similar to FIG. 3 of another form of the apparatus of the present invention with some parts being removed for clarity.
Figure 5:
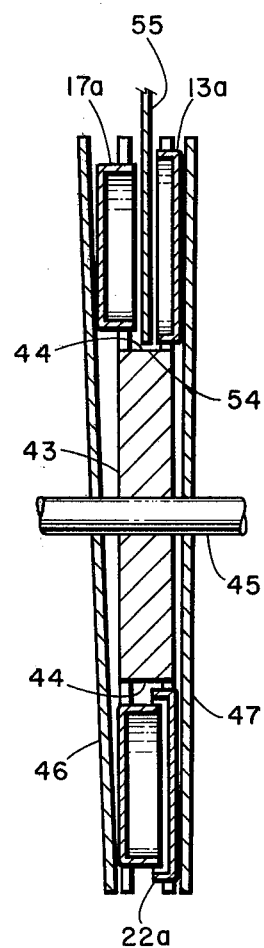
FIG. 5 is a horizontal cross-section view rotated 60° in a counterclockwise direction of a portion of the apparatus of FIG. 4 taken along Line 5—5.

An alternate form of the invention is shown in FIGS. 4 and 5. In this form of the invention the petri dish members are moved through the assembly unit by power driven actuating means, rather than solely by gravity as in the form of the invention shown in FIGS. 1 to 3. The apparatus of FIGS. 4 and 5 comprises a tubular housing 48a corresponding to the right hand portion of housing 48 in FIGS. 1 to 3 and which is provided with control apparatus like that shown in FIGS. 2 and 3. Elements in FIGS. 4 and 5 corresponding to those in FIGS. 1 to 3 are identified by the same numbers with the suffix "a". Top and bottom members 13a and 17a are supplied to housing 48a in face-to-face relation on opposite sides of a separator wall 52a similarly to the operation of the form of the invention shown in FIGS. 1 to 3. A disk or wheel member 43 is fixed onto a suitably driven horizontal shaft 45 and formed with a circumferential slot 54 having a depth slightly greater than the outer diameter of a top member 13a. Disk 43 is also formed with at least one peripheral generally U-shaped cutaway portion or slot 44. In FIG.

4 the disk 43 is formed with four equally spaced slots 44, said slots being canted slightly counterclockwise from the radial direction as shown. The slots 44 extend inwardly to about the same depth as slot 54, i.e., a distance slightly more than the diameter of a top dish member 13a shown therein. The separator wall 52a has an end portion 55 which projects from housing 48a and extends into the circumferential slot 54 in disk 43, said end portion 55 preferably having a shape similar to that of slots 44.

The disk member 43 is positioned between fixedly mounted circular vertical wall members 46 and 47 best shown in FIG. 5 and corresponding to the sidewall portion 51 and sidewall 20 of housing 48 in FIGS. 1 and 2. Discharge means, such as a chute or conveyor 56, is positioned adjacent the periphery of disk 43 at a point diametrically opposite the housing 48a and separator wall extension 55 as shown. Control rod 38a and its actuator 39a are associated with the discharge means 56. The spacing between the peripheral portions of wall members 46 and 47 adjacent the path of travel of the slots 44 as disk 43 is rotated gradually decreases from that shown at the top of FIG. 5 to that shown at the bottom thereof.

The top and bottom members 13a and 17a are fed into each slot 44 as the latter is brought into registry with the adjacent end of housing 48a by rotation of the disk member 43 in a counterclockwise direction as viewed in FIG. 4. When the top and bottom members 13a and 17a initially enter a slot 44, they are positioned in face-to-face substantially coaxial relation on opposite sides of separator wall extension 55. Rotation of disk 43 moves the top and bottom members in said slot 44 from the position adjacent separator wall extension 55 to a position adjacent discharge means 56. During such movement, said top and bottom members are engaged by adjacent peripheral portions of walls 46 and 47, respectively, so that said members are moved toward each other into coaxial telescopic assembled relation by the time they reach the position adjacent discharge means 56. The assembled petri dish unit 22a then rolls out of the slot 44 into discharge means 56 and into engagement with control rod 38a.

The operation of actuators 33a, 36a and 39a as well as control rods 32a, 35a and 38a is the same as described above for FIGS. 1 to 3. Corresponding sensor switches are also employed at Stations A and B but are not shown. Such operations are coordinated with the rotation of disk 43.

While in the above description gravity feed is generally employed to supply the petri dish members to housing 48 or 48a to convey the assembled petri dish 22 or 22a from the apparatus, it is understood that power activated supply and conveyor means can also be employed if desired.

The apparatus of the present invention can be conveniently used to assemble petri dishes from molded top and bottom dish members while still in a sterile condition in a more simple manner than was heretofore employed.

What is claimed is:

1. Apparatus for assembling top and bottom petri dish members each having an open end and a closed end with sides extending therebetween in vertical telescopic relation with the axis of said members extending horizontally comprising in combination first and second conveying means for separately conveying said top and bottom petri dish members respectively and an assembly unit, said first and second conveying means each having a rectangular C-shaped vertical cross-section with an upper groove and a lower groove along which said petri dish members are conveyed on their sides in a vertical position, said first and second conveying means being initially positioned for conveying said petri dish members in a vertical back-to-back relation with said open ends of said top and bottom petri dish members facing away from one another and wherein the second conveying means for the bottom petri dish members has a crossover portion for subsequently supplying said bottom members to the assembly unit in vertical face-to-face relation to said top members with said open ends of said top and bottom petri dish members directly facing one another, said assembly unit being tubular in shape with parallel top and bottom walls, first and second vertical sidewalls and an exit opening and wherein the second vertical sidewall angles toward the first vertical sidewall as the two sidewalls approach the exit opening, said first conveying means positioned so as to supply top petri dish members to the assembly unit adjacent to the first vertical sidewall and said second coveying means positioned so as to supply bottom petri dish members to the assembly unit adjacent to the second vertical sidewall, said first and second conveying means and said assembly unit all being positioned so as to incline downward with respect to the horizontal so that said top and bottom petri dish members can roll on their sides in a vertical position along the conveying means and through the assembly unit, vertical means within said assembly unit for initially maintaining separation of said top and bottom petri dish members from each other as said bottom and top petri dish members enter said assembly unit, vertically actuated control means within said assembly unit for initially separately preventing movement of said top and bottom petri dish members therethrough and then subsequently separately permitting said top and bottom petri dish members to roll in a vertical position through said assembly unit, whereby said vertical bottom petri dish members abut against the angled portion of said second vertical sidewall and are pushed horizontally coaxially into a telescopic assembled relation with the vertical top petri dish members prior to the passage of such vertical top and bottom petri dish members from the exit opening of the assembly unit.

* * * * *